W. H. GRIMSDALE.
APPARATUS FOR COPYING MUSIC SHEETS.
APPLICATION FILED AUG. 26, 1910.
985,258.
Patented Feb. 28, 1911.
3 SHEETS—SHEET 1.
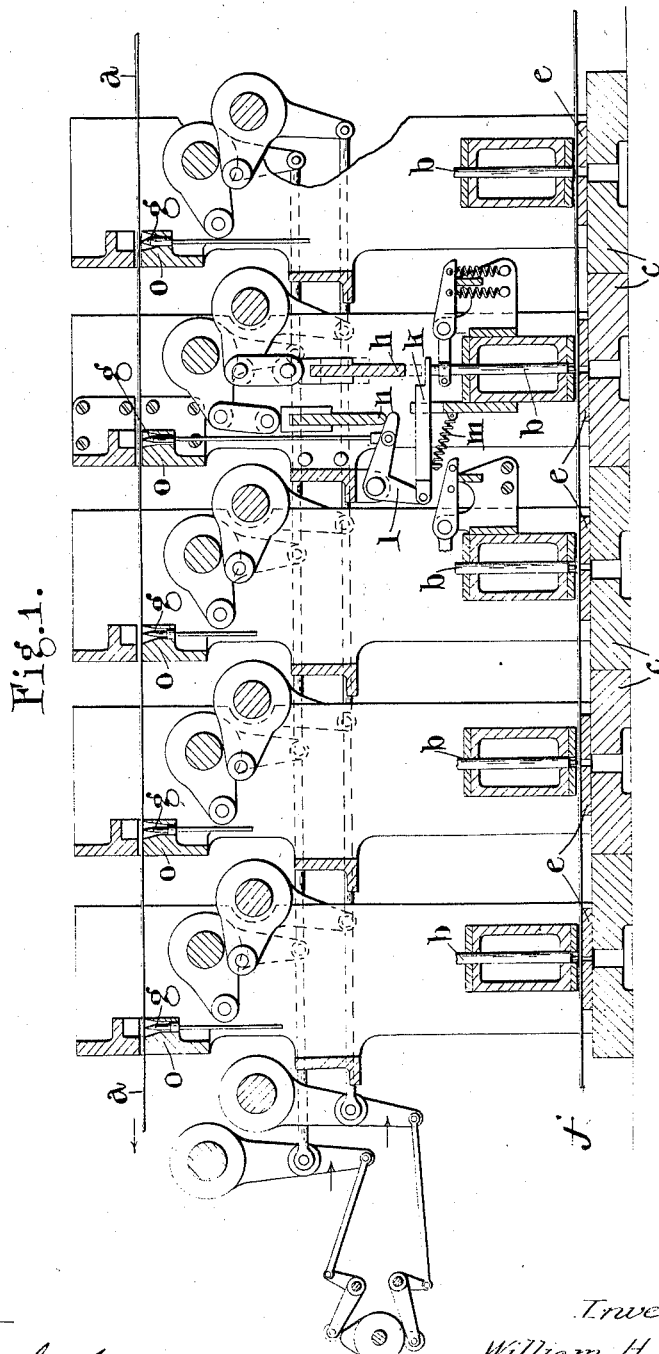

W. H. GRIMSDALE.
APPARATUS FOR COPYING MUSIC SHEETS.
APPLICATION FILED AUG. 26, 1910.
985,258.
Patented Feb. 28, 1911.
3 SHEETS—SHEET 2.
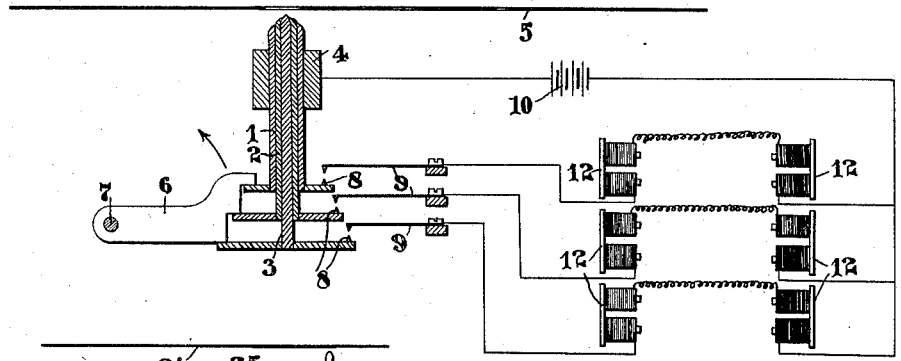
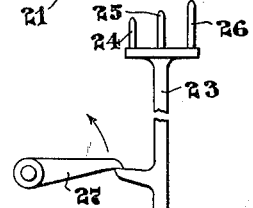
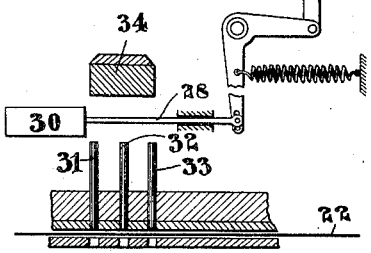
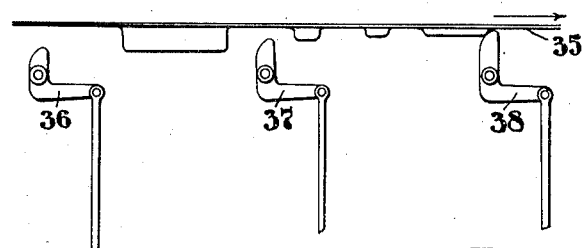
Inventor
William H. Grimsdale.

W. H. GRIMSDALE.
APPARATUS FOR COPYING MUSIC SHEETS.
APPLICATION FILED AUG. 26, 1910.
985,258.
Patented Feb. 28, 1911.
3 SHEETS—SHEET 3.
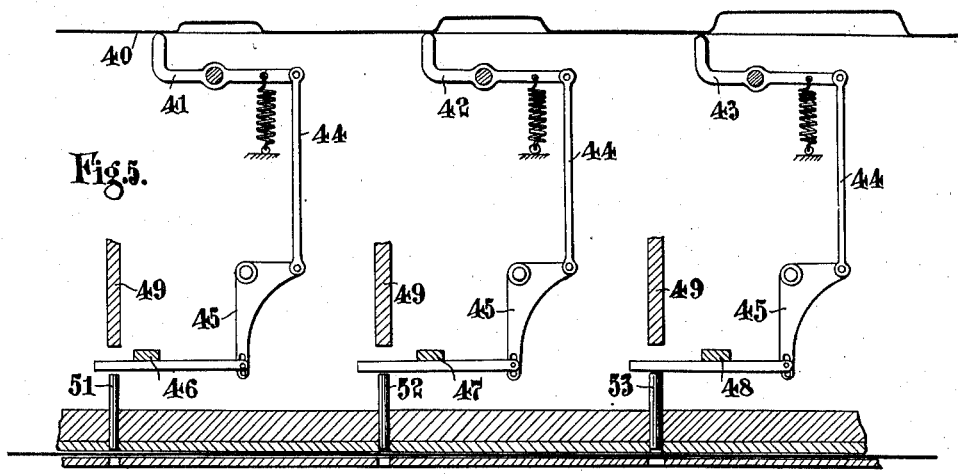
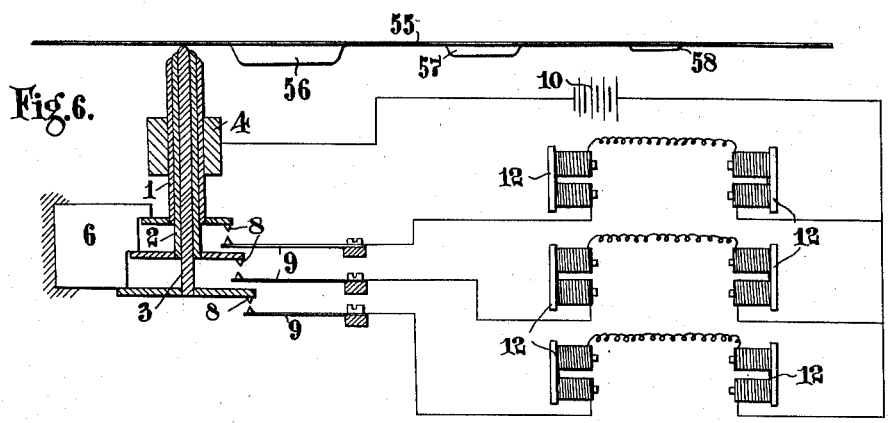
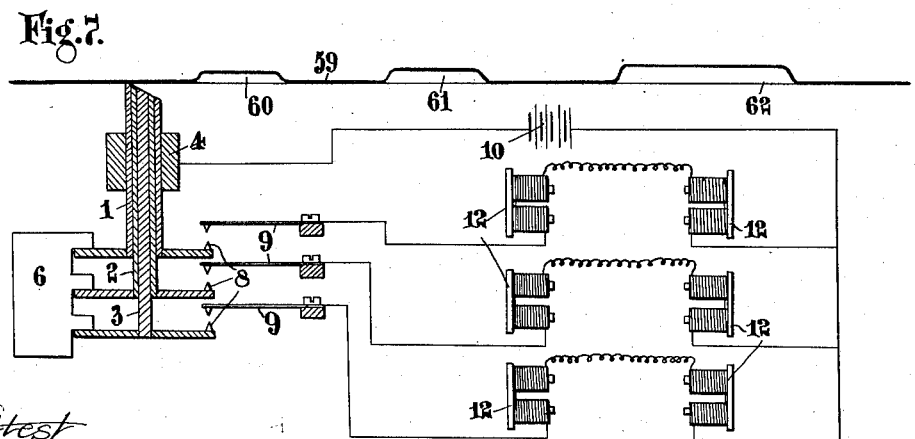
Attest
Bent. W. Hahl.
Edward N. Saxton.
Inventor
William H. Grimsdale
by Spear, Middleton, Donaldson & Spear
Attys.

UNITED STATES PATENT OFFICE.

WILLIAM H. GRIMSDALE, OF TWICKENHAM, ENGLAND, ASSIGNOR TO GRIMSDALE'S PATENTS LIMITED, OF LONDON, ENGLAND.

APPARATUS FOR COPYING MUSIC-SHEETS.

985,258. Specification of Letters Patent. Patented Feb. 28, 1911.

Application filed August 26, 1910. Serial No. 579,128.

*To all whom it may concern:*

Be it known that I, WILLIAM HENRY GRIMSDALE, a subject of the King of Great Britain and Ireland, and residing at "Brantwood," Strafford Road, Twickenham, in the county of Middlesex, England, have invented certain new and useful Improvements in Apparatus for Copying Music-Sheets.

My invention relates to the preparation of music sheets for mechanical piano players and like instruments, and has for its object to construct an apparatus for perforating music sheets which will produce from a master sheet a music sheet or sheets having perforations such that when the sheet is placed in contact with a tracker board the effective areas of the air passages through the sheet into the apertures of said tracker board vary, the variation of the effective areas of the air passages representing different intensities of sound.

The master sheet may be such as is produced by the methods described in the specification of my Patent No. 970,492, granted September 20, 1910, or by hand, or by any other method and may consist of a sheet with perforations of varying width, or with a varying number of perforations to each note according to the effective area required, the variation of the width of the perforation, or the number of perforations to each note representing different intensities of sound. A master sheet could also be used upon which the notes are represented by indentations or depressions of varying depth or by projections of varying height or by other means with variations, the said variations in the representations of notes representing different intensities of sound.

The invention consists broadly in apparatus for producing from a master sheet perforated music sheets having perforations of different effective area, consisting of perforations of varying width or a varying number of separate perforations for each note the different collective effective areas of the separate perforations being adapted to correspond to the different intensities of sound required to be produced in playing.

The invention further consists in apparatus adapted to produce from a master sheet perforated music sheets having perforations of different effective areas, comprising a number of groups of punches or equivalent perforating means, each group comprising a note, the punches of each group being adapted to produce in a music sheet perforations of different effective area, in combination with punch selecting devices for such punches and differentiating selectors controlled by those variations in the representations of notes on the master sheet which represent different intensities of sound.

The invention also consists in the apparatus for reproducing or copying on to a blank sheet or sheets the perforations on a master sheet hereinafter described.

Referring to the accompanying diagrammatic drawings, Figure 1 is a transverse section showing one form of the invention. Fig. 2 illustrates diagrammatically another form of selecting mechanism; Fig. 3 is a partly transverse section and partly longitudinal section of another form of the invention; Fig. 4 shows a further arrangement in which a master sheet having projections is used; Fig. 5 shows the application of the invention to a master sheet having indentations of different depths. Fig. 6 shows the application of concentric differentiating selectors to a master sheet having projections, while, Fig. 7 shows the application of concentric differentiating selectors to a master sheet having indentations of varying depth.

In carrying the invention into effect according to the modification shown in Fig. 1 in which the master sheet *a* is one having perforations of varying width, a number of groups of punches *b* are provided, each group representing a note and consisting of a number of punches of different size, the number of sizes depending upon the number of different widths of perforations in the master sheet which it is desired to reproduce. The punches forming a group may be arranged either concentrically or eccentrically at suitable centers, preferably the latter. Assuming that each group, one of which is illustrated in Fig. 1, consists of five punches *b* of different sizes arranged eccentrically at suitable centers, there will be five rows of punches arranged transversely to the music sheet. Preferably each row will consist of punches of one size, but the different punches forming a group may be arranged in any order of size, and each row might contain punches of different sizes, provided that there is a punch of each size in each group. The number of punches in each row is equal to the number of different notes in the compass of the music sheet, but it will be seen that if it is desired to vary the gradations of the effective area of the air passages in different parts of the compass the size and number of punches forming the groups may, of course, be varied as required. The punches are mounted on suitable frames *c* with die plates *e*, each row being preferably arranged as described in the specification of English Letters Patent No. 26188 of 1907. The blank sheet *f* upon which the reproduction is to be cut is moved forward between the punches and die plates, the master sheet *a* being arranged in any suitable position. Both the master and blank sheets are moved forward either by a continuous or by a step-by-step motion, as desired, and the speeds at which the blank sheet and master sheet move forward may either be the same or may have any suitable speed ratio.

In a suitable position near each row of punches a row of differentiating selectors *g* is provided, each punch in each row provided with a differentiating selector of a suitable size corresponding with the punch to which it is connected. A reciprocating bar *h* and punch selectors *k* for working the punches are provided for each row of punches, each differentiating selector *g* being connected to each punch selector *k* by a bell crank lever *l*. The differentiating selectors consist of reciprocating fingers *g* drawn by gravity or by springs *m* in the direction toward the master sheet and at proper intervals drawn by a reciprocating bar *n* away from the master sheet. The differentiating selectors *g* are so arranged that when relased they will be drawn to and rest against the master sheet except where perforations occur, when selectors of a size smaller than the perforations will go through the master sheet and, these being connected to the punch selectors, the corresponding punches will be actuated.

The selector fingers may be of conical form at the ends which enter the perforations of the music sheet and move in guides *o* at their upper ends so arranged that when the selector fingers are in their normal positions (drawn away from the master sheet) the fingers are held centrally, the guides being suitably widened at the ends nearest the master sheet to allow the selector fingers when in engagement with the master sheet some freedom of movement in the transverse direction of the music sheet, while restraining them from any movement in the longitudinal direction.

When each row contains punches of one size only the rows of punches may be placed in any order, but it is most convenient to have the largest punches first in the direction of travel of the music sheet as all the differentiating selectors in connection with one group will go through one of the largest perforations as it travels from row to row and a large perforation is cut in the blank sheet so that the smaller punches which come after will pass through this perforation without unnecessary wear, whereas if the order were reversed and the smallest punch placed so as to operate first the perforations in the blank sheet would be enlarged as the sheets travel from row to row and each of the smaller punches would be doing unnecessary work.

As in the case of the punching devices, if it is desired to vary the gradations of the area of the air passages in different parts of the compass the differentiating selectors may be varied to correspond with the gradations required.

In the form of the invention shown in Fig. 1, it is assumed that five gradations of effective area are required. For the sake of clearness, it is assumed in the forms of the invention illustrated in Figs. 2, 3, 4, 5, 6, and 7 that three gradations of effective area are required.

In the form of the invention in which concentric punches and dies are used the differentiating selectors are concentric and arranged as shown in Fig. 2. The concentric differentiating selectors 1, 2, 3, move in a guide 4 being normally drawn away from the master sheet by the oscillating bar 6 and pressed by springs or by gravity in the direction of the master sheet 5 so that they will come in contact with the master sheet whenever the oscillating bar 6 is moved upward about its pivot 7. The selectors are provided with contact pieces 8 adapted to make contact respectively with contact springs 9, the contact occurring for each selector when such selector is allowed by a perforation of suitable size to pass upward through the master sheet. The contact pieces, 8, 9, are in circuits containing a source of current 10 and electromagnets 12, 12, three sets of such electromagnets and circuits being provided, each set of electromagnets controlling the selectors of the concentric punches of different sizes. If desired, the movement of the differentiating selectors 1, 2, 3, may be made to actuate the punch and die selectors positively, but the mechanical arrangement for such a device would be somewhat complicated as the movement would have to be transmitted around the music sheet to be perforated. It is therefore more convenient to use electric transmission as above described. In Fig. 2 the movement of the master sheet 5 is in a direction at right angles to the plane of the illustration.

In the form of the invention illustrated in Fig. 3 the master sheet 21 is provided with three perforations for a loud note, two perforations for a medium note and a single perforation for a soft note. In this figure the movements of the master sheet 21 and copy 22 are also in a direction at right angles to the plane of the illustration. The copy 22 to be produced will contain one, two, or three perforations according to the intensity of the note which it represents. In this form of the invention the differentiating selector 23 is in the form of a three-pronged fork with the prongs 24, 25, 26 of different lengths, and the selector will travel vertically a distance which is greater or less according as one, two or three of the prongs are enabled to enter the master sheet when the selector is allowed to travel upward by the oscillation of the stop 27. The punch selector 28 in this case is moved a greater or less distance in the horizontal direction according to the travel of the selector 23 and will bring its thickened piece 30 over one, two or all of the three punches 31, 32, 33, these punches being operated through the piece 30 by the descent of the oscillating bar 34 which extends right across the machine.

Fig. 4 shows a master sheet 35 having projections of varying depth and differentiating selectors 36, 37, 38, one, two or all of which are operated according as a small, medium or deep projection is in operation. Each of the selectors 36, 37, 38 in this case will operate a different size punch operating in a manner analogous to that illustrated in Fig. 1 above. In this case the movement of the master sheet is in a direction parallel to the plane of the illustration. In Figs. 5, 6, and 7, the movement of the master sheet is also assumed to be in a direction parallel to the planes of the illustrations.

In the form of the invention shown in Fig. 5 the master sheet 40 is provided with indentations of different depth corresponding with notes of different intensity. The selectors comprise levers 41, 42, 43 pressing against the master sheet under the action of springs. The levers are connected by rods 44 and bell crank levers 45 to punch selecting devices 46, 47 48 which move in a horizontal direction so as to bring a thickened part between vibrating bars 49 extending across the machine and punches 51, 52, 53 of different sizes. It will be seen that in this modification of the invention the operation of the largest punch 53 will only take place when the selector 48 has moved through the full distance allowed by a deep perforation in the master sheet, while the punch 52 will be operated when the selector has moved through the distance corresponding to the medium indentation, the punch 51 being operated when its corresponding selector 41 is allowed to enter the smallest indentation.

Fig. 6 shows an electromagnet device similar to that above described but applied to a master sheet 55 provided with projections, 56, 57, 58 of varying depth, the operation of the selector being similar to that above described with reference to Fig. 2. Fig. 7 shows a similar arrangement as applied to a master sheet 59, having indentations 60, 61, 62 of varying depths.

It will be seen that the punches forming, the groups of punches or equivalent perforating devices may be in separate machines each machine comprising a row of punches together with selecting devices adapted to differentiate between variations of the representations or notes on the master sheet corresponding to different intensities of sound, the music sheet and master sheet in such cases being passed consecutively through the several machines.

I claim—

1. Apparatus for producing from a master sheet, perforated music sheets having perforations of different effective area, the different effective areas corresponding to the different intensities of sound required to be produced in playing.

2. Apparatus for producing from a master sheet, perforated music sheets having perforations of different effective areas, consisting of perforations of varying width, the different effective areas corresponding to the different intensities of sound required to be produced in playing.

3. Apparatus for producing from a master sheet, perforated music sheets having perforations of different effective areas, consisting of a varying number of separate perforations for each note, the different collective effective areas of such separate perforations corresponding to the different intensities of sound required to be produced in playing.

4. Apparatus for producing from a master sheet, perforated music sheets, having perforations of different effective areas, comprising in combination a number of groups of punches, each group representing a note, the punches of each group being adapted to produce in a music sheet perforations of different effective area, punch selecting devices for said punches, and differential selectors controlled by the variations in the representation of notes in the master sheet, which represent different intensities of sound.

5. Apparatus for producing from a master sheet, perforated music sheets having perforations of different effective areas, comprising in combination groups of punches of different diameters, means for traversing the music sheet to be perforated longitudinally past said punches, punch selecting devices including selecting fingers having conical points adapted to enter the perforations in the master sheet, means for traversing the master sheet past said selecting fingers, and means for operating said punches and selector fingers, as set forth.

In testimony whereof, I affix my signature in presence of two witnesses.

WILLIAM H. GRIMSDALE.

Witnesses:
 W. GRYLLS ADAMS,
 BERTRAM H. MATTHEWS.